United States Patent [19]

Bauer et al.

[11] 4,395,301

[45] Jul. 26, 1983

[54] ADHESIVE COMPOSITIONS AND METHOD

[75] Inventors: Herbert Bauer, Lutry, Switzerland; Gerhard Piestert, Schwetzingen; Heinz G. Gilch, Bad Homburg-Kirdorf, both of Fed. Rep. of Germany

[73] Assignee: USM Corporation, Farmington, Conn.

[21] Appl. No.: 199,348

[22] Filed: Nov. 24, 1980

[51] Int. Cl.³ ............................ C09J 5/02; C08F 20/10
[52] U.S. Cl. ............................ 156/307.5; 106/287.21; 106/288 Q; 156/310; 156/314; 156/332; 427/302; 427/333; 427/340; 427/407.1; 523/176; 526/204; 526/323.1; 526/328
[58] Field of Search ............ 427/302, 340, 333, 407.1; 260/42.21; 526/204, 328, 323.1; 106/288 Q, 287.21; 156/307.5, 314, 310, 332, 331.5; 523/176

[56] References Cited

U.S. PATENT DOCUMENTS

| | | | |
|---|---|---|---|
| 2,578,910 | 12/1951 | Uraneck | 526/204 |
| 3,658,624 | 4/1972 | Lees | 156/310 |
| 3,833,536 | 9/1974 | Steinbeck et al. | 260/42.21 |
| 3,837,963 | 9/1974 | Frauenglass et al. | 156/310 |
| 3,855,040 | 12/1974 | Malofsky | 156/332 |
| 3,959,100 | 5/1976 | McGinniss | 260/42.21 |
| 4,055,542 | 10/1977 | Saito | 526/204 |
| 4,285,755 | 8/1981 | Piestert et al. | 156/314 |

FOREIGN PATENT DOCUMENTS 861404 2/1961 United Kingdom .

*Primary Examiner*—John J. Gallagher
*Attorney, Agent, or Firm*—John P. Morley

[57] ABSTRACT

Novel, improved adhesive compositions curable at ambient temperature to form adhesive bonds between opaque, impervious, substrates without external application of heat, light or other radiation. The adhesive compositions of this invention comprise one or more ethylenically unsaturated monomers, a source of free radicals, and an activator comprising an azine dye material or the reaction product of an azine dye material with a reducing agent.

12 Claims, No Drawings

ADHESIVE COMPOSITIONS AND METHOD

BACKGROUND OF THE INVENTION

(1) The Field of the Invention

This invention relates to improved adhesive compositions. More precisely, this invention relates to adhesive compositions including ethylenically unsaturated compounds, a source of free radicals and an activator comprising an azine dye material.

(2) Description of the Prior Art

Many polymerizable compositions are known which are believed to cure or harden by free radical polymerization of ethylenically unsaturated components. Such components may include for example acrylic or methacrylic monomers, vinyl chloride, vinylidene chloride, vinyl acetate, styrene, itaconic acid, maleic acid, and unsaturated polyesters.

In the field of polymerizable adhesives for example, reactive fluid adhesive compositions are known which cure at room temperature by addition polymerization of monomeric components to provide adhesive bonds between surfaces of many different materials. Adhesive compositions intended to cure between opaque, impervious, or other materials to form an adhesive bond may comprise one or more polymerizable acrylate or methacrylate ester monomers, a source of free radicals such as a peroxide, hydroperoxide, per ester or per acid, and an activator for interaction with the source of free radicals to initiate polymerization of the monomers at room temperature. The source of free radicals and the activator may be stored separated from each other prior to use of the adhesive; for example one of them may be incorporated in admixture with the monomers during storage. In this way, the adhesive composition comprises two parts and the composition is cured to form an adhesive bond when the two parts are brought together in absence of oxygen.

In one particularly convenient method of using two part reactive fluid adhesives, one part of the composition comprising the activator is applied to a surface to be bonded in the manner and form of a primer. Thereafter, the other part of the composition comprising the polymerizable monomers and source of free radicals is applied to the primer coated surface. This method permits the use of the adhesive composition without the necessity of mixing the two parts prior to application. The activator is conveniently one which can be used in non-stoichiometric quantities with respect to the monomers.

While bonds formed from two part adhesive compositions are highly useful, certain two part compositions comprise amine-aldehyde reaction products as activators which are liquid materials having a certain degree of toxicity and offensive odor. In view of the increasing emphasis in favor of using non-toxic materials in commercial products, it is desirable to provide an adhesive composition comprising an activator system having a more acceptable level of toxicity and odor. In this context, the use of solid materials as activators may be an apparent consideration. However, the achievement of a commercially acceptable adhesive bond usually implies that bond forming materials cannot be present in the bond in solid form.

An object of the present invention is to provide an activator for use with polymerizable, room temperature curing adhesive compositions comprising ethylenically unsaturated monomeric acrylate and methacrylate esters, and to provide adhesive compositions including such activators.

Another object of the present invention is to provide an activator for use with polymerizable compositions comprising ethylenically unsaturated monomers, which activator comprises material which can be readily manufactured from relatively inexpensive raw materials.

Other objects and advantages of the present invention will be apparent from the following description of the invention and the preferred embodiments thereof.

SUMMARY OF THE INVENTION

The adhesive compositions of the present invention are curable at ambient temperature to form adhesive bonds between for example opaque, impervious, substrates without external application of heat, light or other radiation. The compositions comprise one or more ethylenically unsaturated monomers provided by monomeric acrylic or methacrylic acid esters, a source of free radicals, and an activator comprising organic material which is an azine dye material or the reaction product of an azine dye material with a reducing agent.

DESCRIPTION OF THE PREFERRED EMBODIMENT

Azine dye materials useful as activators in the present invention can be manufactured in known manner e.g. by a condensation reaction between a diprimary diamine and a diketone. According to the invention, useful activator providing azine dye materials are those which can be treated or reacted with a reducing agent to provide a reduced form or product capable of initiating cure of the polymerizable adhesive composition. However, as will be seen later, some azine dye materials need not necessarily be so treated to provide effective activators. The reduced form of the azine material may be made by a simple reduction reaction which involves treating the azine dye material with a suitably strong reducing agent e.g. lithium aluminum hydride ($LiAlH_4$) in boiling benzene for two hours, and isolating the product. Certain preferred azine dye materials are marketed in the form of their water soluble quaternary ammonium salts of sulphuric or hydrochloric acid and can easily be converted into a form in which, in acidic medium (provided by the monomers) they are activators useful in the present invention. These salts are also soluble to a required extent for purposes of this invention in low boiling organic solvents, and compatible with reactive components of the adhesive composition.

Preferred activator azine dye materials of the present invention include those known in the art as phenazine, Amethystviolett and Azineschwarzfarbstoff and reduced forms thereof. Other azine dye materials which in their reduced form provide preferred activators of the present invention are known in the art as Safranin, Safranin O, Janusgrün, Methyleneviolett, Azokarmin B, Azokarmin G and Neutralrot. Each of these materials is characterized by having present in its molecule at least one six membered ring which includes two nitrogen atoms and which is linked directly to two substituted or unsubstituted aromatic hydrocarbon ring systems. The aromatic hydrocarbon ring systems may have for example alkyl or aryl substituents, primary, secondary, or tertiary amino substituents, or azo linked substituents. In each of these six membered rings including two nitrogen atoms, either two of the nitrogen atoms are members of azine groupings $>C=N-$ or one of the nitrogen atoms is a member of an azine grouping and the second is a nitrogen atom linked to a further aromatic ring. The materials are at leasat partially in ionic form, and in some cases the second nitrogen is a quaternary nitrogen atom. The structural formulae for preferred azine dye materials providing acitvators of the present invention are listed below.

a generator of free radicals for example a hydroperoxide, to yield free radicals as shown schematically below with respect to phenazine and Methyleneviolett.

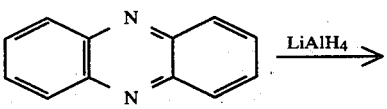

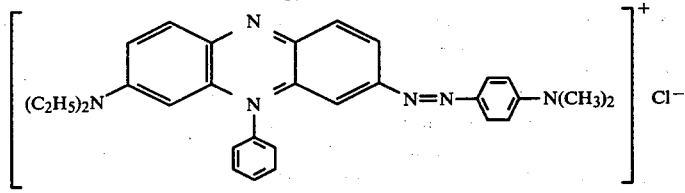

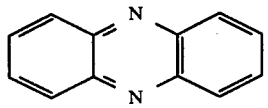

FORMULA 1. PHENAZINE

FORMULA 2. JANUSGRÜN (Janus Green)

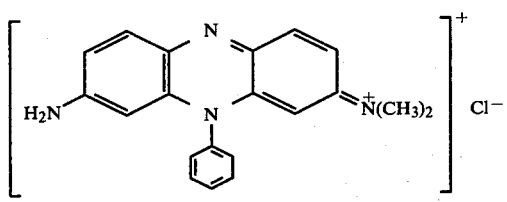

FORMULA 3. METHYLENEVIOLETT (Methylene Violet)

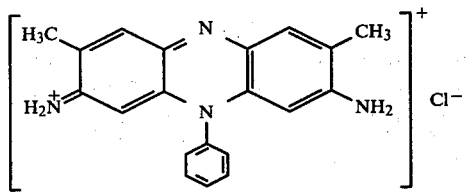

FORMULA 4. SAFRANIN (Safranine)

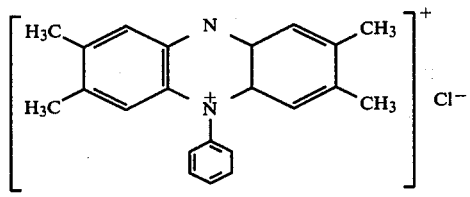

FORMULA 5. SAFRANIN O (Safranine O)

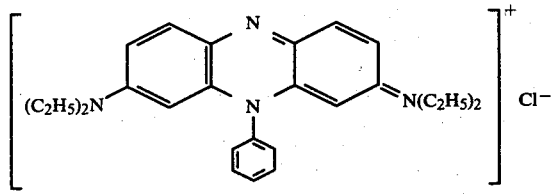

FORMULA 6. AMETHYSTVIOLETT (Amethyst Violet)

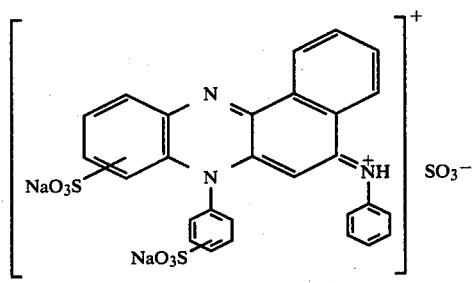

FORMULA 7. AZOKARMIN B. (Azocarmine B)

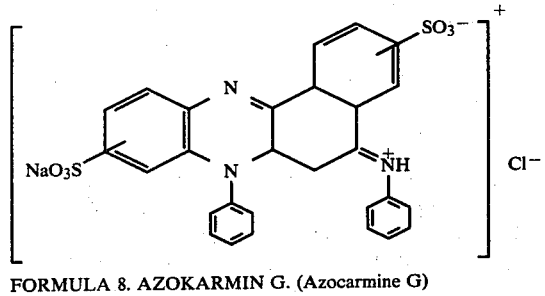

FORMULA 8. AZOKARMIN G. (Azocarmine G)

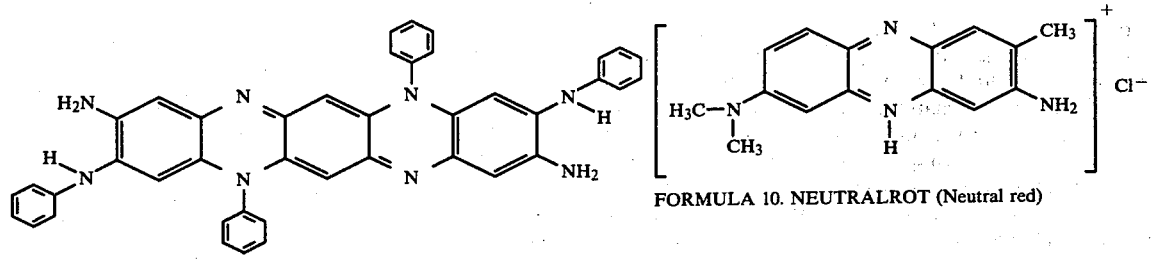

FORMULA 9. AZINE SCHWARZFARBSTOFF (BASF)
(A black azine dye)

FORMULA 10. NEUTRALROT (Neutral red)

It is believed that in the above preferred activator providing azine dye materials, one or more of the azine groups of the molecule are converted or reduced to secondary amino groups. These secondary amine groups are oxidizable in acid medium in the presence of

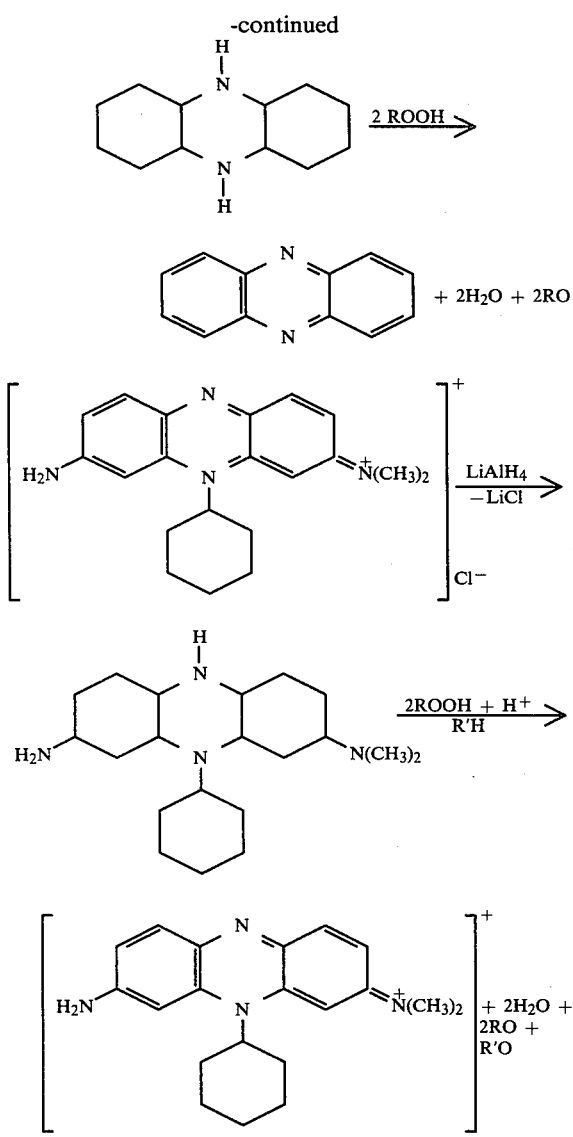

It is also believed that in those materials where one only of the azine groups is converted to a secondary amino group, acid present in the adhesive composition takes part in the oxidation reaction and is converted to the corresponding ion. Where the acid present is acrylic acid, the resulting ion may be present in polymeric form.

The preferred activators are soluble to an acceptable extent in volatile organic solvent for application to a substrate. They are regarded as odorless, non-toxic materials, and at room temperature, in conjunction with acrylic and methacrylic acid ester monomers and a source of free radicals provide adhesive bonds of good strength and performance between impervious substrates.

The source of free radicals and the activator are stored in separate containers prior to use. Preferably the source of free radicals is included with the polymerizable monomers in the first or adhesive part together with inhibitors and stored in polyethylene bottles including a significant quantity of atmospheric oxygen in order to maintain stability of the first part. The activator is preferably stored as a solution in organic solvent to provide a second or activator part of the adhesive composition. Preferably, the activator composition is stored in dark colored bottles or in a light impervious aerosol container.

As mentioned, the activator part is not required to be mixed in stoichiometric quantities with the adhesive part of the composition. In use, the activator part and adhesive part of the composition may be mixed together just prior to use, or the activator part may be applied to one or both substrates and the polymerizable adhesive part applied later to the surface of the substrate carrying the applied activator. The activator part preferably comprises sufficient organic solvent so that the activator part may be readily applied to the substrate such as by brushing to provide a very thin, solid deposit after evaporation of the solvent. Alternatively, the activator part may be packaged with a propellant in an aerosol container from which required quantities may be readily dispensed. Additional materials may be included in the activator part as required. For example film forming polymeric material(s) or liquid polymerizable monomer(s) may be included such as a methacrylate ester monomer which may be 2-hydroxypropyl methacrylate or trimethylol propane trimethacrylate or a mixture thereof, to provide the desired deposit on the substrate.

The activator part may conveniently comprise from about 1 up to about 15% by weight of the selected activator azine dye material in an organic solvent such as methanol, toluene, methylene chloride or mixtures of these. These activator parts are effective in the presence of a source of free radicals to bring about cure in the absence of oxygen (air) of polymerizable adhesive parts comprising one or more ethylenically unsaturated compounds. The time required to bring about setting of the composition is comparatively short, and may be reduced further by inclusion in the activator part of certain promoters such as sulphur-containing and/or transition metal compounds. When used here, the expression "transition metal" means a metal which is capable of more than one stable valency state and which is capable of forming complexes. Notable examples of such metals are vanadium, chromium, manganese, iron, cobalt, nickel and copper. For rapid setting, mixtures of these materials may be employed such as a mixture of 0.1 to 1% by weight of the solution of sulphur-containing compound and 0.05 to 0.5% by weight of the solution of transition metal compound. The preferred promoter materials are soluble in commonly used organic solvents.

Where solid promoter materials are used, it is preferred to include in the activator part a small amount of liquid monomer capable of retaining the solids in a thin film laid down from the activator part.

Sulphur compounds for use in activator parts according to the invention include among others, organic thiols, organic disulphides and organic sulphur compounds also having nitrogen in their molecule. Suitable organic thiols (RSH) include dodecylmercaptan, octylmercaptan, phenyldimercaptan and thioglycolic acid. Suitable organic disulphides (R—S—S—R') include phenyldisulphide. Suitable organic compounds also having nitrogen in their molecule include thioacetamide, tetramethylthiouramdisulphide, thiocarbanilide, thiourea, 1-allyl-2-thiourea, 2-mercapthothiazoline, 2-mercaptobenzothiazole and 2,5-dimercapto-1,3,4-thiadiazole.

Transition metal compounds for use in activator parts according to the invention include compounds comprising the metal as a chelated compound for example with a β-diketone or ethylene or propylene diamine, or as a compound of an organic acid or alcohol for example naphenates (e.g. of cobalt, nickel, manganese), octoates (e.g. of copper), hexoates and propionates (e.g. of iron). Preferred materials are acetyl acetonates of vanadium, copper, cobalt and iron.

Polymerizable adhesive parts comprising one or more ethylenically unsaturated compounds, which can be beneficially employed with activators of the present invention include room temperature curable adhesive compositions such as those which are stable when stored with air in polyethylene bottles but which polymerizable between opaque, impervious, surfaces by virtue of exclusion of oxygen from the bond line. Suitable adhesives include—and preferably are—those comprising one or more of the diacrylates or dimethylacrylates of mono, di, tri or tetra ethylene glycol, trimethacrylates from trihydric alcohols such as trimethylol propane trimethacrylate, hydroxy and glycidyl terminated esters of acrylic and methacrylic acid for example 2-hydroxypropyl methacrylate, hydroxyethyl methacrylate, glycidyl methacrylate and reaction products of these latter having two or more acrylate or methacrylate terminal groups such as those derived from 2-hydroxy propyl methacrylate and pyromellitic acid dianhydride, and acrylates and methacrylates derived from epoxy resins, and mixtures thereof. An organic acid is preferably included with acrylic or methacrylic acid being preferred. The acid not only serves to enhance adhesion but also may take part in the chemical reaction of the activator and peroxide to yield free radicals. Polymers such as butadiene acrylonitrile, and polymethyl methacrylate may also be included in the adhesive part together with adhesion promoters, acrylic or methacrylic acid, and normal additives for adhesive compositions if desired.

Inhibitors (e.g. hydroquinone or 2,6,di-t-butyl-4-methyl-phenol) are included in the first or adhesive part to inhibit spurious polymerization of the monomers.

Acrylates and methacrylates preferred for use in the adhesive compositions are tetraethylene glycol dimethacrylate, trimethylol propane trimethacrylate, 2-hydroxypropylmethacrylate, glycidylmethacrylate, and a diacrylate derived from an epoxy resin and mixtures of two or more thereof.

The source of free radicals is maintained separate from the activator part prior to polymerization and is preferably incorporated in the first or adhesive part with the polymerizable monomers. Suitable sources of free radicals include organic peroxides (including hydroperoxides) peresters and peracids. Preferred materials are cumene hydroperoxide and 2,5-dimethyl-2,5-di(t-butyl-peroxy) hexane.

From the above description, it should be apparent that the present invention provides a two part adhesive composition curable at room temperature to provide an adhesive bond, the composition comprising an adhesive part including ethylenically unsaturated monomer and a source of free radicals and an activator part including an azine dye material activator or an activator which is the product of the reaction of an azine dye material and a reducing agent.

The advantages of the invention as well as the manner of making and using it will be more fully appreciated by the following illustrative, non-limiting Example.

EXAMPLE

Each of the compositions referred to below was in two parts. A first or adhesive part comprised one or more polymerizable materials comprising one or more acrylic or methacrylic acid residues per molecule, and a source of free radicals. A second or activator part comprised an activator capable of cooperation with the source of free radicals (at the time of intimate contact between the two parts) when located between two impervious substrates with exclusion of oxygen to bring about curing of the adhesive to bond the substrates together without external application of heat or actinic radiation.

The first part of an adhesive composition fluid at 20° C. was made up using ingredients in amounts by weight as follows:

| Component | Example first part of adhesive |
|---|---|
| Tetraethylene glycol dimethacrylate | 32 |
| Trimethylolpropane trimethacrylate | 20 |
| 2-Hydroxypropyl methacrylate | 30 |
| Acrylic acid | 10 |
| Butadiene acrylonitrile rubber | 5 |
| Cumene hydroperoxide | 3 |
| Hydroquinone | 0.1 |

The butadiene acrylonitrile rubber used was Perbunan N3807NS supplied by Bayer AG.

The first part of the adhesive composition was made up by dissolving the rubber in methylene chloride, adding the other components with the exception of the cumene hydroperoxide, and then removing the methylene chloride by distillation at 50° C. under vacuum. After cooling the solution to room temperature, the cumene hydroperoxide was added.

Various activator parts were made up as follows.

Phenazine and azine dye materials as listed in Table 3 were treated with LiAlH in boiling ether/benzene over 2 hours and the reaction products were then isolated as described in Chem.Ber.85, Nr.5/1952.

The reaction products of the treated or reduced form of the phenazine and the azine dye materials were dissolved in organic solvent (methanol or methanol and acetone mixed 1:1 by volume) to provide a series of activator parts A of Table 1 which follows. A further series of activator parts B of Table 1 was provided which additionally contained 0.1% by weight vanadium acetonyl acetonate. The formulations are shown in Table 1. In order to demonstrate the behavior of the reduced form of azine dye materials with different transition metal additives, different sulphur containing compounds, and mixtures thereof, further series C, D and E respectively of activator parts were also made up, as shown in Tables 2, 3 and 4. These activator parts of Tables 1, 2, 3 and 4 were used in conjunction with the first or adhesive part described before to form sample bonds as follows:

Glass plate substrates were solvent wiped, and a thin layer of the selected activator applied to one of the surfaces to be bonded and the solvent allowed to evaporate. The adhesive part was applied as a thin layer and the glass plates pressed together in partially overlapping relation with the adhesive between them at standard room temperature (23° C.±2° C.). The bonds were tested by pulling the glass plates apart by hand. When this could no longer be done, the adhesive was regarded as set. The shortest time after which the bonds could not be opened manually was recorded as the setting time. The results are shown in Tables 1, 2, 3 and 4 which follow. It was observed that the time within which the activators retained their activating ability after application to the surface was of the order of two hours.

TABLE 1

| Activator Treated Form of | Quantity Solvent | Setting Time Series A | Series B |
|---|---|---|---|
| Phenazine | 5% in Methanol/Acetone 1:1 | 30 min. | 40 sec. |
| Janusgrun | 5% in Methanol | 20 h. | 5-10 min. |
| Methyleneviolett | 2.5% in Methanol | 2 h. | 40 sec. |
| Safranin | 10% in Methanol | 6 h. | 40 min. |
| Safranin O | 10% in Methanol | 5 h. | 45 sec. |
| Amethystviolett | 3% in Methanol | 2 h. | 5-10 min. |
| Azokarmin B | 5% in Methanol | 1 h. | 20 sec. |
| Azokarmin G | 1% in Methanol | 1½ h. | 30 sec. |
| Azineschwarzfarbstoff | 2% in Methanol | 30 min. | 50 sec. |
| Neutralrot | 5% in Methanol | 4 h. | 4 min. |

TABLE 2

| Activator Part | Series C | Setting Time |
|---|---|---|
| Treated form of Phenazine 5% in Methanol | without additive | 30 min. |
| Treated form of Phenazine 5% in Methanol | +0.1% Va—Acetylacetonate | 40 sec. |
| Treated form of Phenazine 5% in Methanol | +0.1% Va—Oxydacetylacetonate | 40 sec. |
| Treated form of Phenazine 5% in Methanol | +0.1% Cu—Acetylacetonate | 15 min. |

TABLE 3

| Activator Part | Series D | Setting Time |
|---|---|---|
| Treated form of Phenazine 5% in Methanol | +1% Dodecylmercaptan | 25 min. |
| Treated form of Phenazine 5% in Methanol | +1% thioglycolic acid | 5 min. |
| Treated form of Phenazine 5% in Methanol | +1% allylthiourea | 6 min. |

TABLE 4

| Activator Part | Series E | Setting Time |
|---|---|---|
| Treated form of Phenazine 5% in Methanol | +0.1% Va—Acetylacetonate<br>+1.0% Allythiourea | 15 sec. |
| Treated form of Phenazine 5% in Methanol | +1.0% Cu—Acetylacetonate<br>+1.0% Allylthiourea | 2 min. |

A further series of activator parts, series F of Table 5 which follows, were made up using selected amounts of a sulphur-containing compound and various metal compounds with phenazine, Azineschwarzfarbstoff, and Amethystviolett which had not been subjected to the reducing treatment described before. The setting time of the adhesive part in conjunction with these activator parts was determined on glass-glass bonds as described above. Formulations and results are shown in Table 5.

TABLE 5

| Activator Composition | Series F | Setting Time |
|---|---|---|
| 2% Phenazine in Methanol (Non-treated form) | | 3 h. |
| 2% Phenazine in Methanol (Non-treated form) | +0.1% Va AcAc | 35 sec. |
| 2% Phenazine in Methanol (Non-treated form) | +1% Allylthiourea | 10 min. |
| 2% Phenazine in Methanol (Non-treated form) | +0.1% Va AcAc<br>+1% Allylthiourea | 20 sec. |
| 2% Azineschwarzfarbstoff in Methanol (Non-treated form) | | 30 min. |
| 2% Azineschwarzfarbstoff in Methanol (Non-treated form) | +0.1% Va AcAc | 50 sec. |
| 2% Azineschwarzfarbstoff in Methanol (Non-treated form) | +1% Allylthiourea | 5 min. |
| 2% Azineschwarzfarbstoff in Methanol (Non-treated form) | +0.1% Va AcAc<br>+1% Allylthiourea | 20 sec. |
| 2% Amethystviolett in Methanol (Non-treated form) | | 90 min. |
| 2% Amethystviolett in Methanol (Non-treated form) | +0.1% Va AcAc | 4 min. |
| 2% Amethystviolett in Methanol (Non-treated form) | +1% Allylthiourea | 10 min. |
| 2% Amethystviolett in Methanol (Non-treated form) | +0.1% Va AcAc<br>+1% Allylthiourea | 1 min. |

Va AcAc signifies vanadium (III) acetyl acetonate.

From the results of Table 5, it can be seen that a setting time of less than three hours at room temperature of the adhesive and activator part combinations can be achieved with the selected azine dye materials. Further, it can be seen that setting times at room temperature can be reduced by appropriate selection or treatment of the starting material and by inclusion of selected sulphur compounds or metal compounds alone or in combination. Thus by appropriate selection of materials setting times at room temperature of a few seconds or several minutes or even hours may be achieved.

Attempts were also made to use non-treated azine dye materials of Formulas 2-5,7 and 9 as activators but the attempts were unsuccessful. Accordingly, azine dye materials suitable for the practice of this invention can be broadly defined as azine dye materials which can be treated with a reducing agent to provide an effective activator. All of the azine dye materials of Tables 1-4 for example, are so treated. However, Table 5 establishes that some of the azine dye materials of Tables 1-4 need not be so treated to provide effective activators. For the purposes of this invention therefore, the term "azine dye materials" means those which can be treated with a reducing agent to provide an effective activator. If a selected azine dye material can be so treated it is included within the scope of the term irrespective of whether such treatment is actually necessary to provide an effective activator.

It should be noted that the setting times of the Example were measured on glass substrates in order that the comparison between various combinations of adhesive part and activator part should not be unduly influenced by possible catalytic effect of the substrate surface on the curing reaction. In practice, these adhesive compositions are required to be capable of use to give satisfactory adhesive bonds by curing at room temperature in bonds using any of a variety of substrate materials some of which (e.g. steel, copper, brass, stainless-steel) are likely to have a significant effect in reducing the setting time and some of which (e.g. chromium, tin, zinc) are likely to have less effect or even no significant effect (e.g. pvc) on the setting time.

A further factor requiring consideration is the desirability for the adhesive compositions to be capable of use and performance without additional use of externally applied heat, light or other curing treatment under a variety of normal ambient temperature conditions ranging at least from about 5° C. to 30° C.

We claim:

1. A two part adhesive composition curable on combination at room temperature to provide a cured adhesive composition, one part of the composition being a polymerizable adhesive part comprising a source of free radicals and an ethylenically unsaturated monomer selected from the group consisting of diacrylates or dimethacrylates of mono, di, tri or tetraethylene glycol, trimethacrylates from trihydric alcohols, hydroxy and glycidyl terminated esters of acrylic and methacrylic acid and reaction products of these having two or more acrylate or methacrylate terminal groups, acrylates and methacrylates derived from epoxy resins and, mixtures of these monomers, the other part being an activator part and comprising an azine dye material which can be reacted with a reducing agent to provide a product capable of initiating curing of the first part and where said azine dye material is selected from the group consisting of:

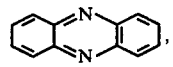

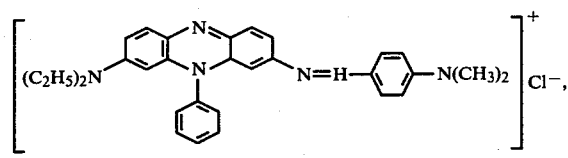

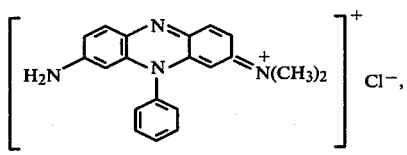

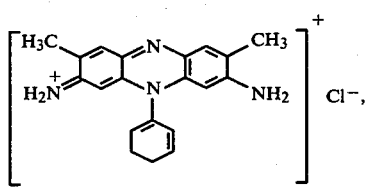

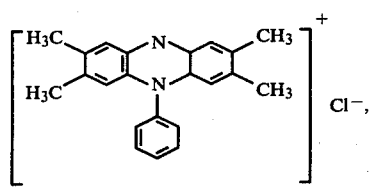

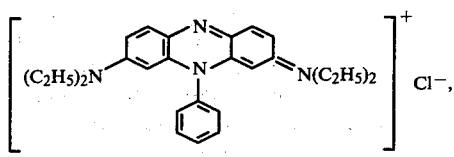

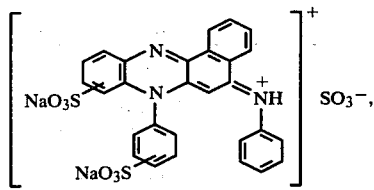

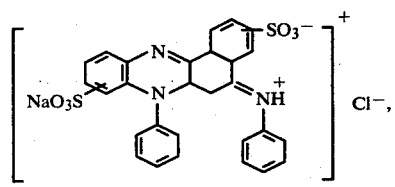

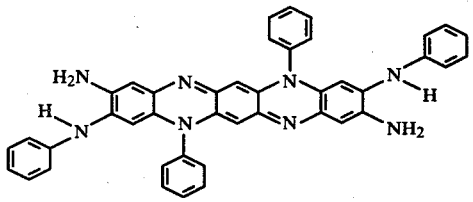

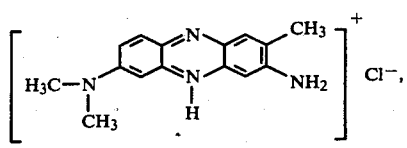

or mixtures of these and where said activator further includes a promoter selected from the group consisting of sulfur containing compounds, transition metal compounds and mixtures of these.

2. A two part adhesive composition of claim 1 where the activator part comprises an azine dye material selected from the group consisting of:

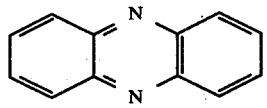

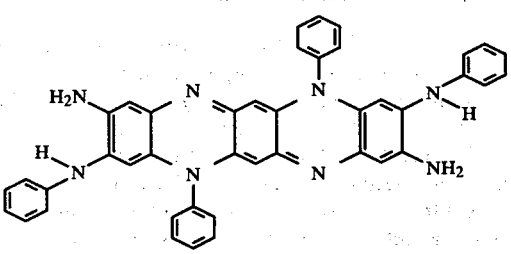

-continued

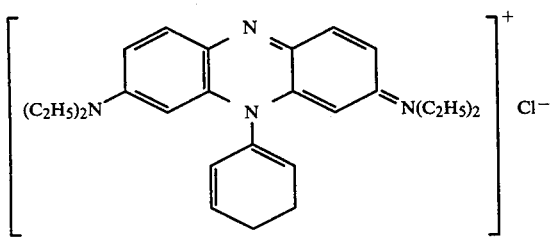

or mixtures of these.

3. A two part adhesive composition of claim 1 where the promoter comprises a sulphur containing compound chosen from the group consisting of organic thiols, organic disulphides, organic sulfur compounds having nitrogen in their molecule or mixtures of these.

4. A two part adhesive composition of claim 1 where the promoter comprises a transition metal compound chosen from the group consisting of vanadium (III) acetonyl acetonate, copper (II) acetonyl acetonate, or vanadium (IV) oxide-acetyl acetonate.

5. A two part adhesive composition of claim 1 where the promoter comprises a sulphur containing compound chosen from the group consisting of organic thiols, organic disulfides, organic sulphur compounds having nitrogen in their molecules or mixtures of these and a transition metal compound chosen from the group consisting of vanadium (III) acetonyl acetonate, copper (II) acetonyl acetonate, vanadium (IV) oxide-acetyl acetonate or mixtures of these.

6. A two part adhesive composition of claim 1 where said activator part also comprises a polymerizable methacrylate ester monomer.

7. A two part adhesive composition of claim 6 where the polymerizable methacrylate ester monomer is chosen from the group consisting of 2-hydroxypropyl methacrylate, trimethylol propane trimethacrylate or a mixture of these.

8. A two part adhesive composition of claim 1 where said monomer of the polymerizable adhesive part is chosen from the group consisting of tetraethylene glycol dimethacrylate, trimethylol propane trimethacrylate, 2-hydroxypropyl mthacrylate, glycidyl methacrylate, a diacrylate or dimethacrylate derived from an epoxy resin, a dimethacrylate derived from 2-hydroxypropyl dimethacrylate and pyromellitic acid dianhydride, or mixtures of these.

9. A two part adhesive composition of claim 1 where said polymerizable adhesive part also comprises acrylic acid and a source of free radicals comprising cumene hydroperoxide.

10. A two part adhesive composition of claim 1 where said polymerizable adhesive part also comprises a butadiene acrylonitrile copolymer.

11. A two part adhesive composition of claim 1 where said polymerizable adhesive part includes a source of free radicals chosen from the group consisting of an organic peroxide, a hydroperoxide, a perester, a peracid or mixtures of these.

12. A method of adhesively bonding two air-impervious substrates at ambient temperature which comprises the steps of
(a) applying an activator part of claim 1 to a surface of one or both of the substrates,
(b) allowing the applied activator part to dry,
(c) applying the polymerizable adhesive part of claim 1 to one of the surfaces carrying the applied activator,
(d) pressing the substrates together with the polymerizable and activator compositions in intimate contact with exclusion of air and
(e) allowing polymerization of the monomer to form and adhesive bond between the surfaces.

* * * * *